[12] United States Patent
Tochihara

(10) Patent No.: US 10,352,260 B2
(45) Date of Patent: Jul. 16, 2019

(54) FUEL VAPOR PURGE SYSTEM

(71) Applicant: HAMANAKODENSO CO., LTD., Kosai, Shizuoka-pref. (JP)

(72) Inventor: Hideya Tochihara, Kosai (JP)

(73) Assignee: Hamanakodenso Co., Ltd., Kosai, Shizuoka-Pref. (JP)

( * ) Notice: Subject to any disclaimer, the term of this patent is extended or adjusted under 35 U.S.C. 154(b) by 0 days.

(21) Appl. No.: 15/364,313

(22) Filed: Nov. 30, 2016

(65) Prior Publication Data

US 2017/0167415 A1 Jun. 15, 2017

(30) Foreign Application Priority Data

Dec. 14, 2015 (JP) ................. 2015-243347

(51) Int. Cl.
*F02M 25/08* (2006.01)
*F02D 41/22* (2006.01)
(Continued)

(52) U.S. Cl.
CPC ....... *F02D 41/0042* (2013.01); *F02D 41/003* (2013.01); *F02D 41/22* (2013.01);
(Continued)

(58) Field of Classification Search
CPC .. F02D 41/0042; F02D 41/004; F02D 41/003; F02D 41/0032; F02D 41/0037; F02D 2041/224; F02D 2041/225; F02D 2041/228; F02M 25/0836; F02M 25/0854; F02M 25/089; F02M 25/0809; F02M 25/0818; F02M 25/08; F02M 25/0872; F02M 35/10222; F02M 2025/0845; G01M 3/045; G01M 3/04; G01M 3/02; G01M 3/2876
(Continued)

(56) References Cited

U.S. PATENT DOCUMENTS

2002/0162457 A1 11/2002 Hyodo et al.
2003/0024510 A1 2/2003 Veinotte et al.
(Continued)

FOREIGN PATENT DOCUMENTS

DE 102011104424 A1 12/2012
DE 102015114079 A1 3/2016
(Continued)

*Primary Examiner* — George C Jin
(74) *Attorney, Agent, or Firm* — Harness, Dickey & Pierce, P.L.C.

(57) ABSTRACT

A fuel vapor purge system includes: a fuel tank; a canister; a passage component that defines an intake passage of an internal-combustion engine; a purge pump pumping vapor fuel; and a valve device having a valve object, a main part having an internal passage, an inflow port through which the vapor fuel pumped from the canister flows into the main part, an outflow port connected with the inflow port through the internal passage and being opened to the intake passage, and a leak port connected with the inflow port through the internal passage and being opened to outside of the main part. The leak port has a leak preventive structure which prevents the vapor fuel from leaking to outside when the valve device is attached to the passage component such that the vapor fuel is able to flow into the intake passage.

10 Claims, 8 Drawing Sheets

(51) Int. Cl.
*F02D 41/00* (2006.01)
*F02M 35/10* (2006.01)

(52) U.S. Cl.
CPC ...... *F02M 25/089* (2013.01); *F02M 25/0809* (2013.01); *F02M 25/0818* (2013.01); *F02M 25/0836* (2013.01); *F02M 25/0854* (2013.01); *F02M 35/10222* (2013.01); *F02D 2041/224* (2013.01); *F02D 2041/225* (2013.01); *F02M 2025/0845* (2013.01); *Y02T 10/40* (2013.01)

(58) Field of Classification Search
USPC ........................................ 251/366; 73/40.5 R
See application file for complete search history.

(56) References Cited

U.S. PATENT DOCUMENTS

| | | |
|---|---|---|
| 2003/0029425 A1 | 2/2003 | Veinotte et al. |
| 2003/0034014 A1 | 2/2003 | Veinotte et al. |
| 2003/0034015 A1 | 2/2003 | Veinotte et al. |
| 2003/0037772 A1 | 2/2003 | Veinotte et al. |
| 2003/0056771 A1 | 3/2003 | Veinotte et al. |
| 2003/0056852 A1 | 3/2003 | Veinotte et al. |
| 2003/0070473 A1 | 4/2003 | Veinotte et al. |
| 2009/0000603 A1* | 1/2009 | Takakura ............ F02D 41/0042 123/520 |
| 2009/0255516 A1 | 10/2009 | Matsumoto |
| 2014/0095048 A1* | 4/2014 | Peterson ............... B60W 50/14 701/101 |
| 2015/0013437 A1 | 1/2015 | Takakura |
| 2016/0061153 A1 | 3/2016 | Jeffrey |
| 2016/0061154 A1* | 3/2016 | Swartz ............... F02M 25/0818 123/520 |
| 2016/0131055 A1 | 5/2016 | Jeffrey |
| 2016/0369714 A1 | 12/2016 | Burleigh et al. |

FOREIGN PATENT DOCUMENTS

| | | |
|---|---|---|
| DE | 102016210579 A1 | 12/2016 |
| EP | 1395742 A1 | 3/2004 |
| JP | 2002-349364 A | 12/2002 |
| JP | 4082004 B2 | 4/2008 |

* cited by examiner

FUEL VAPOR PURGE SYSTEM

CROSS REFERENCE TO RELATED APPLICATION

This application is based on Japanese Patent Application No. 2015-243347 filed on Dec. 14, 2015, the disclosure of which is incorporated herein by reference in its entirety.

TECHNICAL FIELD

The present disclosure relates to a fuel vapor purge system.

BACKGROUND

JP 4082004 B2 describes a fuel vapor purge system that supplies fuel vapor from a canister to an intake passage of an internal combustion engine through a purge passage. Specifically, when the engine is operated, the fuel vapor is supplied by opening a purge control valve and by rotating a purge pump forward.

SUMMARY

In case where the purge pump is rotated forward in the state where the purge control valve is opened, if the purge control valve is not fitted to the intake passage, it cannot be determined whether the purge control valve is not fitted, since pressure in the intake passage is close to atmospheric pressure. If the purge pump is operated in the state where the purge control valve is not fitted, fuel vapor is emitted to outside air.

It is an object of the present disclosure to provide a fuel vapor purge system, in which leak of fuel can be detected when a valve device is not fitted.

According to an aspect of the present application, a fuel vapor purge system includes: a fuel tank storing fuel; a canister adsorbing vapor fuel emitted from the fuel tank, the canister being able to desorb the vapor fuel; a passage component that defines an intake passage of an internal-combustion engine in which the vapor fuel desorbed from the canister and fuel for combustion are mixed and combusted; a purge pump pumping the vapor fuel from the canister toward the intake passage through a purge passage; a valve device having a valve object switching between a permission state in which the vapor fuel is allowed to flow into the intake passage and a prohibition state in which the vapor fuel is prohibited from flowing into the intake passage, the valve device being mounted to the passage component to control a flow of the vapor fuel pumped by the purge pump; an internal pump arranged integrally with the canister to emit gas to atmosphere or draw atmospheric air; and a control device which controls the valve object between the permission state and the prohibition state. The valve device has: a main part having an internal passage; an inflow port through which the vapor fuel pumped from the canister flows into the main part, an outflow port connected with the inflow port through the internal passage and being opened to the intake passage, and a leak port connected with the inflow port through the internal passage and being opened to outside of the main part. The leak port has a leak preventive structure which prevents the vapor fuel from leaking to outside when the valve device is mounted to the passage component such that the vapor fuel is able to flow into the intake passage. The control device determines that there is an abnormality when the internal pump is operated in a state where the valve object is controlled in the prohibition state and when an absolute value of a pressure change ratio detected at a predetermined position in a passage from the fuel tank to the valve device is less than a predetermined value.

In case where gas is discharged by the internal pump, at a normal time when the valve device is properly fitted, since the vapor fuel is continuously discharged out of the passage by the internal pump, the detected pressure should be a negative pressure relative to atmospheric pressure.

In case where gas is discharged by the internal pump, at an abnormality time, since the leak port communicates to the atmospheric air, the atmosphere air introduced into the passage through the leak port is continuously discharged, such that the degree of negative pressure relative to atmospheric pressure becomes smaller in the detected pressure.

In case where atmosphere air is introduced into the passage by the internal pump, at a normal time when the valve device is properly fitted, the atmospheric air is continuously introduced to the closed passage, and the detected pressure should be a positive pressure relative to atmospheric pressure.

In case where atmosphere air is introduced into the passage by the internal pump, at an abnormality time, for example, when the valve device is not fitted, since the leak port communicates to outside, the atmosphere air introduced into the passage by the internal pump is continuously discharged outside through the leak port, such that the degree of positive pressure relative to atmospheric pressure becomes smaller in the detected pressure.

Thus, the control device can determine that there is an abnormality when the absolute value of the change in the detected pressure is less than a predetermined value. Therefore, when the valve device is not fitted as an abnormality, the fuel vapor purge system can detect the leak using the internal pump.

According to an aspect of the present application, a fuel vapor purge system includes: a fuel tank storing fuel; a canister adsorbing vapor fuel emitted from the fuel tank, the canister being able to desorb the vapor fuel; a passage component that defines an intake passage of an internal-combustion engine in which the vapor fuel desorbed from the canister and fuel for combustion are mixed and combusted; a purge pump pumping the vapor fuel from the canister toward the intake passage through a purge passage; a valve device having a valve object switching between a permission state in which the vapor fuel is allowed to flow into the intake passage and a prohibition state in which the vapor fuel is prohibited from flowing into the intake passage, the valve device being mounted to the passage component to control a flow of the vapor fuel pumped by the purge pump; and a control device which controls the valve object between the permission state and the prohibition state. The valve device has: a main part having an internal passage; an inflow port through which the vapor fuel pumped from the canister flows into the main part; an outflow port connected with the inflow port through the internal passage and being opened to the intake passage; and a leak port connected with the inflow port through the internal passage and being opened to outside of the main part. The leak port has a leak preventive structure which prevents the vapor fuel from leaking to outside when the valve device is mounted to the passage component such that the vapor fuel is able to flow into the intake passage. The control device determines that there is an abnormality when the purge pump is operated in a state where the valve object is controlled in the prohibition state and when an absolute value of a pressure change ratio detected at a predetermined position in a passage from the fuel tank to the valve device is larger than or equal to a predetermined value.

In case where the purge pump pumps gas toward the intake passage, at a normal time when the valve device is properly fitted, vapor fuel is sent to the closed passage as gas. At this time, a difference between the detected pressure and atmospheric pressure is small.

In case where the purge pump pumps gas toward the intake passage, at an abnormality time, for example, when the valve device is not fitted, since the leak port communicates to outside, the gas sent toward the intake passage is continuously discharged to outside. At this time, the difference between the detected pressure and atmospheric pressure becomes large.

In case where the purge pump pumps gas toward the fuel tank, at a normal time when the valve device is properly fitted, vapor fuel is sent to the closed passage as gas. At this time, a difference between the detected pressure and atmospheric pressure is small.

In case where the purge pump pumps gas toward the fuel tank, at an abnormality time, for example, when the valve device is not fitted, since the leak port communicates to outside, the outside air introduced through the leak port is continuously sent toward the fuel tank. At this time, the difference between the detected pressure and atmospheric pressure becomes large.

Thus, when the absolute value of the change in the detected pressure is larger than or equal to a predetermined value, the control device can determine that there is abnormality. Therefore, the fuel vapor purge system can detect the leak that is caused by the abnormality in the valve device, using the purge pump.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
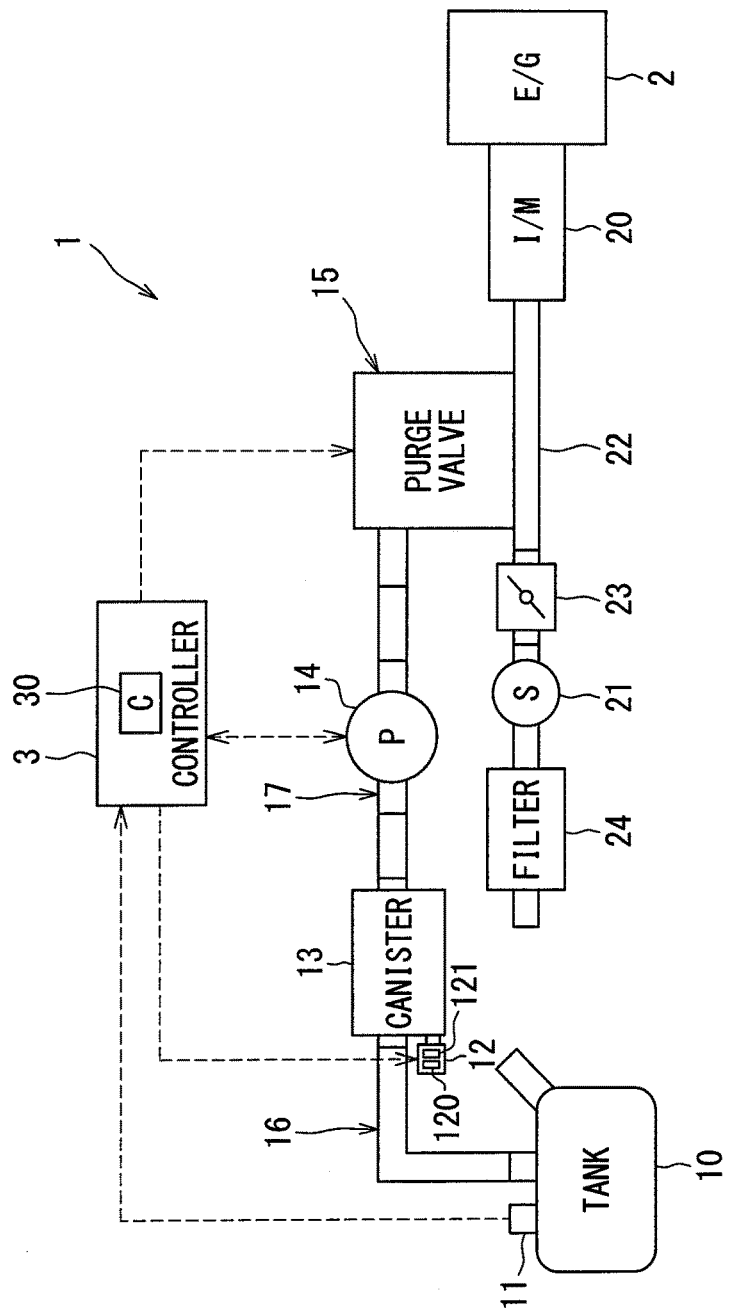
FIG. 1 is a schematic view illustrating a fuel vapor purge system according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A fuel vapor purge system 1 according to a first embodiment is explained referring to FIG. 1 to FIG. 5. The fuel vapor purge system 1 supplies, for example, HC gas in fuel adsorbed on a canister 13 to an intake passage of an internal-combustion engine, and prevents vapor fuel from being emitted from a fuel tank 10 to the atmosphere. As shown in FIG. 1, the fuel vapor purge system 1 includes an intake system of the internal-combustion engine 2 which defines the intake passage of the internal-combustion engine 2, and a purge system which supplies vapor fuel to the intake system of the internal-combustion engine 2.

The vapor fuel introduced into the intake passage of the internal-combustion engine 2 is mixed with fuel for combustion supplied to the internal-combustion engine 2 from an injector, and is combusted in a cylinder of the internal-combustion engine 2. In the internal-combustion engine 2, at least the vapor fuel desorbed from the canister 13 and the fuel for combustion are mixed and combusted. The intake system of the internal-combustion engine 2 includes an intake pipe 22 connected to an intake manifold 20, a throttle valve 23, a supercharger 21, and an air filter 24 arranged in the intake pipe 22. The intake passage of the internal-combustion engine 2 includes the intake manifold 20, the intake pipe 22, the throttle valve 23, the supercharger 21, and the air filter 24.

The purge system includes a vapor passage 16 connecting the fuel tank 10 to the canister 13, and a purge passage 17 connecting the canister 13 to the intake pipe 22 through the purge valve 15. The purge pump 14 is arranged in the middle of the purge passage 17. The purge passage 17 includes an internal passage of the purge pump 14 and an internal passage of the purge valve 15. The intake pipe 22 is a passage component which forms the intake passage of the internal-combustion engine 2.

The air filter 24 is disposed on the upstream side in the intake pipe 22 to catch dust in intake air. The throttle valve 23 adjusts a valve opening degree in the entrance part of the intake manifold 20 to control the amount of intake air flowing into the intake manifold 20. The supercharger 21 pressurizes intake air which passed through the air filter 24, and supplies the pressurized air to the intake manifold 20. The intake air passes through the intake passage in order of the air filter 24, the supercharger 21, and the throttle valve 23, and flows into the intake manifold 20. The intake air is mixed with the fuel for combustion injected from the injector to define a predetermined air/fuel ratio so as to be combusted in the cylinder.

The fuel tank 10 is a container which stores fuel such as gasoline. The fuel tank 10 is connected to the inflow part of the canister 13 by piping which forms the vapor passage 16. The canister 13 includes adsorption material such as activated carbon. The vapor fuel generated in the fuel tank 10 is drawn into the canister 13 through the vapor passage 16, and is adsorbed temporarily at the adsorption material. A valve module 12 is integrally formed in the canister 13. The valve module 12 includes a canister closing valve (CCV) 120 which opens and closes an inlet part for drawing fresh outside air, and an internal pump 121 which pumps inside gas to outside or draws outside air into the inside. Atmospheric pressure can be applied in the canister 13, because the canister 13 is equipped with CCV 120. The canister 13 is able to easily desorb (purge) the vapor fuel from the adsorption material using fresh air.

An end of the purge passage 17 is connected to the outflow part of the canister 13 where the vapor fuel desorbed from the adsorption material flows out. The other end of the purge passage 17 is connected to the inflow part of the purge pump 14. The purge pump 14 and the purge valve 15 are connected to each other by piping which forms a part of the purge passage 17. The purge pump 14 is a fluid drive equipment equipped with a turbine rotated by an actuator such as motor, for purging, and pumps the vapor fuel from the canister 13 toward the intake passage of the internal-combustion engine 2.

The purge valve 15 is an opening and closing mechanism having a valve object 152 to open and close the purge passage 17. The purge valve 15 also opens and closes a fuel supply passage 153 defined inside of a main part 150 of the purge valve 15. The purge valve 15 permits the vapor fuel to be supplied from the canister 13 to the internal-combustion engine 2, and prevents the supply of the vapor fuel from the canister 13 to the internal-combustion engine 2. The purge valve 15 is an electromagnetic valve equipment equipped with the valve object 152, an electromagnetic coil 151, and a spring. The purge valve 15 is energized or not energized by the control device 3 to control the valve opening degree of the fuel supply passage 153 from the full open state to the full closed state. The valve object 152 of the purge valve 15 is moved based on a difference between the biasing force of the spring and an electromagnetic force generated when supplying electric power to the electric circuit of the electromagnet coil 151. When the valve object 152 is separated from a valve seat formed in the main part 150, the fuel supply passage 153 is opened.

The purge valve 15 is a normally closed valve device. Specifically, the purge valve 15 is a valve device which maintains the closed state of the fuel supply passage 153 normally. When voltage is not impressed, the fuel supply passage 153 is in the closed state. When voltage is impressed, the fuel supply passage 153 is opened. The purge valve 15 is an example of a valve device that allows or prohibits vapor fuel to flow into the intake passage of the intake pipe 22 from the purge passage 17. The valve device is not limited to the purge valve 15 in which the opening degree is adjustable, or may also be an opening-and-closing valve which switches between a full open state and a full closed state. In this case, the intake pipe 22 is equipped with the opening-and-closing valve as a valve device, and the purge valve 15 which is able to control a flow rate is installed in the passage from the fuel tank 10 to the opening-and-closing valve.

When electric power is supplied to the electric circuit by the control device 3, the valve object 152 of the purge valve 15 separates from the valve seat, because the electromagnetic power becomes larger than the elastic power of the spring, and the fuel supply passage 153 is opened. The control device 3 supplies power to the electromagnet coil 151 by controlling a duty ratio which is a ratio of the ON time to one cycle formed of the ON time and OFF time. The purge valve 15 is also called duty control valve. The flow rate of the vapor fuel in the fuel supply passage 153 can be adjusted by controlling the power supplied to the purge valve 15.

Figure 2:
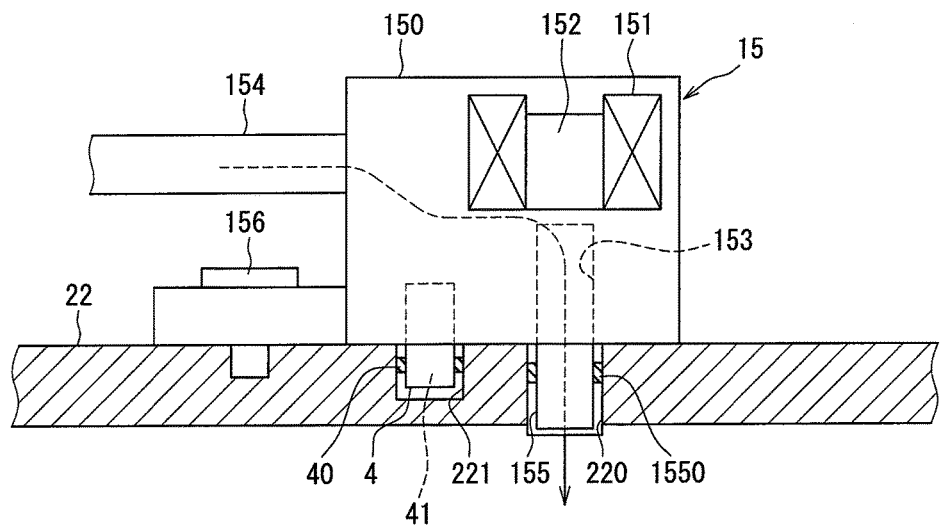
FIG. 2 is an enlarged view illustrating a connection structure between a purge valve and an intake pipe of the fuel vapor purge system of the first embodiment.
Figure 3:
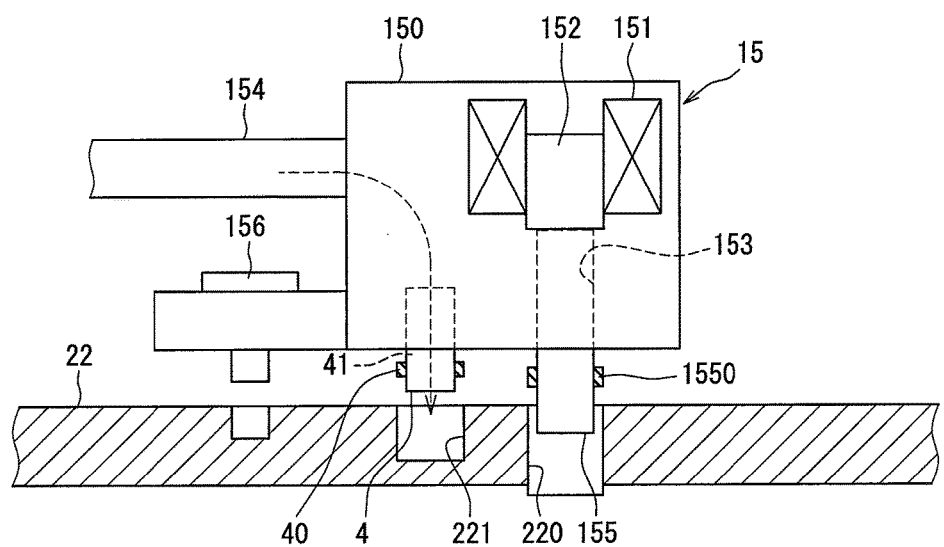
FIG. 3 is an enlarged view illustrating a state where the purge valve is not fitted with the intake pipe.

The fuel vapor purge system 1 includes the valve device mounted to the intake pipe 22 as a passage component which defines the intake passage. As shown in FIG. 2, the main part 150 of the purge valve 15 is fixed to the intake pipe 22 by a holding member 156 (fastening member such as screw, bolt, or bracket). The electromagnet coil 151, the electric circuit, the valve object 152, and the fuel supply passage 153 are defined inside of the main part 150.

The main part 150 has an inflow port 154 as an inflow passage where the vapor fuel flows from the canister 13, and an outflow port 155 connected to the inflow port 154 through the fuel supply passage 153 and connected to the intake passage. Furthermore, the main part 150 has a leak port 4 connected to the inflow port 154 through an internal passage inside of the main part 150 and also connected to outside of the main part 150. This internal passage is connected also with the fuel supply passage 153 when the valve object 152 separates from the valve seat.

A leak passage 41 defined inside of the leak port 4 is connected with the internal passage in the main part 150, and has a cylindrical shape projected from the main part 150, similarly to the outflow port 155. A part or all of the leak port 4 projected from the main part 150 is received in a recess portion 221 formed in the intake pipe 22 when the purge valve 15 is properly connected to the intake pipe 22. Therefore, in this state, the passage extending from the inflow port 154 to the leak port 4 through the internal passage is made as a closed passage by the recess portion 221. Thus, the leak port 4 has the leak preventive structure which prevents vapor fuel from leaking to the outside when the purge valve 15 is fitted with the intake pipe 22.

As shown in FIG. 2, in the state where the valve device is properly equipped to the intake pipe 22, the outflow port 155 passes through the intake pipe 22, and is connected and inserted into an engine port 220 which communicates the intake passage to outside of the intake pipe 22. A clearance between the outer circumference of the outflow port 155 and the inner circumference of the engine port 220 is sealed by a seal component 1550 such as O ring mounted to the outer circumference of the outflow port 155.

As shown in FIG. 2, in the state where the valve device is properly equipped to the intake pipe 22, the leak port 4 is connected and inserted into the recess portion 221, and is fitted in the recess portion 221 of the intake pipe 22. A clearance between the outer circumference of the leak port 4 and the inner circumference of the recess portion 221 is sealed by a seal component 40 such as O ring mounted to the outer circumference of the leak port 4.

The electric circuit is connected to a connector to which electric power is supplied from the outside. The electric circuit is energized through an electric wire connected with the connector. The electromagnetic coil 151 generates the electromagnetic power to drive the valve object 152, such that the fuel supply passage 153 is opened.

The control device 3 is an electronic control unit of the fuel vapor purge system 1. The control device 3 includes at least one central processing unit (CPU), and one memory equipment as a storage medium which memorizes a program and data. The control device 3 may include a microcomputer equipped with the storage medium which can be read by computer. The storage medium is a non-transitory tangible storage medium which stores un-temporarily a program which can be read by computer. The storage medium may be a semiconductor memory or a magnetic disk. The control device 3 may be provided by a single computer or a set of computer resources linked with each other via a data communication device. The program is executed by the control device 3 such that the control device 3 functions as a device disclosed in the specification of the present application, and the control device 3 functions to perform methods disclosed in the specification of the present application.

The method or functions provided by the control system may be provided by software recorded in a tangible memory device and a computer executing the software, only by the software, only by hardware, or by a combination of them. For example, when the control device 3 is provided by hardware of an electric circuit, the control device 3 can be provided by a digital circuit including multiple logic circuits or an analog circuit.

The control device 3 performs basic control, such as fuel purging in the fuel vapor purge system 1. The control device 3 includes a determination circuit 30 which determines abnormality such as detachment of the purge valve 15, or leak of the vapor fuel from the passage. For this reason, the control device 3 is connected to control each actuator of the purge pump 14, the purge valve 15, CCV 120, and the internal pump 121.

The control device 3 is connected to an actuator such as motor of the purge pump 14, and controls the purge pump 14 by driving the motor, regardless of operation of the internal-combustion engine 2. The control device 3 is connected to a motor of the internal pump 121, and controls the internal pump 121 by driving the motor, regardless of operation of the internal-combustion engine 2. Signals corresponding to the number of rotations of the internal-combustion engine 2, a flow rate of intake air, a temperature of cooling water, and an internal pressure of the fuel tank 10 detected by a pressure sensor 11 are inputted into the input port of the control device 3.

Vapor fuel drawn into the intake manifold 20 from the canister 13 is mixed with the fuel for combustion supplied to the internal-combustion engine 2 and combusted in the cylinder of the internal-combustion engine 2. The air/fuel ratio which is a mixture ratio of the fuel for combustion and the intake air is controlled to a predetermined air/fuel ratio in the cylinder of the internal-combustion engine 2. The control device 3 carries out duty control of the open/close time of the purge valve 15, such that the purge amount of vapor fuel is controlled to maintain the predetermined air/fuel ratio if vapor fuel is purged.

The fuel vapor purge system 1 is a system which prevents fuel evaporated in the fuel tank 10 from being discharged to the atmosphere. If the fuel vapor purge system has an abnormality such as leak from a hole caused by a fall out of a component, the vapor fuel may leak to the atmosphere. Moreover, the driver of a vehicle may not know the abnormality even if the abnormality arises.

The fuel vapor purge system 1 determines whether there is an abnormality, for example, a detachment of the valve device from the passage component which defines the intake passage. The fuel vapor purge system 1 can quickly detect the abnormality.

The abnormality detection control is explained with reference to the flow chart of FIG. 4, and the graph of FIG. 5. The control device 3 performs processing according to the flow chart of FIG. 4. This flow chart operates irrespective of the vehicle situation. The flow chart is executed when the vehicle is parked or when the internal-combustion engine 2 is operating. The abnormality detection control can be periodically performed irrespective of ON and OFF of the internal-combustion engine 2.

When this flow chart is started, the control device 3 controls the purge valve 15 at S10 not to be supplied with current to the electric circuit, such that the purge valve 15 is closed. The control device 3 starts operation of the internal pump 121 at S20. Since gas is discharged by the internal pump 121 out of the passage from the fuel tank 10 to the purge valve 15, the internal pressure inside the fuel tank 10 is made in a negative pressure state where the pressure is lower than atmospheric pressure.

The control device 3 continues this state for a predetermined period of time, such that it can be determined whether there is abnormality such as detachment of the purge valve 15. At S30, the control device 3 acquires the signal of the internal pressure in the fuel tank 10 detected by the pressure sensor 11, and the determination circuit 30 determines whether a normal condition of the valve device is satisfied to determine that there are no abnormalities in the valve device.

Figure 5:
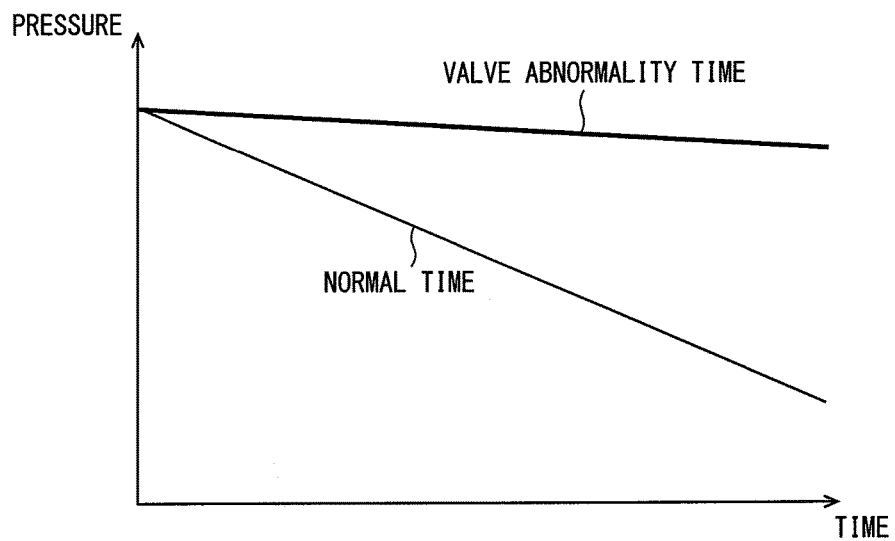
FIG. 5 is a graph illustrating a pressure change at a normal time and a pressure change at an abnormality time in the purge valve of the first embodiment when an internal pump pumps gas to atmospheric air.

In this state, when the sealing by the seal component 40 is normal, the pressure value detected by the pressure sensor 11 continuously decreases from atmospheric pressure by operation of the internal pump 121, as shown in a pressure change of the normal time in FIG. 5. Conversely, at an abnormality time when the sealing by the seal component 40 is not achieved, since gas is discharged outside from the leak port 4, the pressure value detected by the pressure sensor 11 does not decrease compared with the normal time. The negative pressure state is not obtained at the abnormality time shown in FIG. 5.

The normal condition is met, for example, when the absolute value of the pressure change per unit time (pressure change ratio) is larger than or equal to a predetermined value. Therefore, the determination circuit 30 determines that there is an abnormality when the absolute value of the pressure change ratio is less than the predetermined value. The determination circuit 30 determines that there is no abnormality when the absolute value of the pressure change ratio is more than or equal to the predetermined value.

When the determination circuit 30 determines that the normal condition is not satisfied at S30, the control device 30 alarms the abnormality in the valve device at S35, and the abnormality detection control is ended. The user of the vehicle can fix the valve device based on this alarm. When a predetermined time passes after the repair is completed, S10 will be started again.

For example, a predetermined lamp is made on or blinking so that the abnormality in the valve device is indicated in S35. Alternatively, the abnormality is shown in a predetermined display such as screen, a warning sound or a sound voice which reports the abnormality.

When the determination circuit 30 determines that the normal condition is satisfied at S30, since the determination result is normal, a normal determination processing is performed at S40, and this abnormality detection control is finished. When a predetermined time passes after the end of the abnormality detection control, S10 will be started again. Thus, the abnormality detection control is performed at an interval of predetermined time, irrespective of whether the internal-combustion engine 2 is operating.

Although this abnormality detection control can be carried out when the vehicle is parked or driving, it is desirable to perform when the vehicle is parked, because it is easy to detect a clear pressure change when the engine is stopped. Moreover, since the purging cannot be performed when checking a leak, it is useful to carry out the abnormality detection control at the parked time from a viewpoint of the operation efficiency of the fuel vapor purge system 1.

According to the first embodiment, the fuel vapor purge system 1 includes the fuel tank 10, the canister 13, the passage component which defines the intake passage of the internal-combustion engine 2, the purge pump 14 pumping vapor fuel from the canister 13 toward the intake passage through the purge passage 17, the valve device and the internal pump 121. The valve device has the valve object 152 switching between the permission state in which vapor fuel is allowed to flow into the intake passage and the prohibition state in which vapor fuel is prohibited from flowing into the intake passage. The valve device is mounted to the passage component, and controls the flow of vapor fuel pumped by the purge pump 14. The internal pump 121 is formed integrally with the canister 13, and pumps gas to outside, or draws atmospheric air to inside.

The valve device has the inflow port 154 through which vapor fuel flows into the main part 150, the outflow port 155 connected to the inflow port 154 through the internal passage inside of the main part 150 and opened to the intake passage, and the leak port 4. The leak port 4 is connected to the inflow port 154 through the internal passage, and is opened to the outside of the main part 150. The leak port 4 has the leak preventive structure which prevents vapor fuel from leaking to the exterior when the passage component is equipped with the valve device such that vapor fuel is able to flow into the intake passage.

The control device 3 operates the internal pump 121 in the state where the valve object 152 is controlled in the prohibition state (S10, S20), and detects the pressure at the predetermined position in the passage from the inside and a refueling port of the fuel tank 10 to the valve device. When the absolute value of the pressure change ratio detected in this way is less than a predetermined value, the control device 3 determines that there is an abnormality (S30, S35).

At a normal time when the valve device is properly equipped, gas such as vapor fuel is continuously discharged out of the passage by the internal pump 121, the degree of negative pressure relative to atmospheric pressure becomes large in the detected pressure. At an abnormality time in the valve device, since the leak passage 41 communicates with outside air, the outside air introduced through the leak passage 41 is continuously discharged to outside by the internal pump 121, the degree of negative pressure relative to atmospheric pressure becomes small in the pressure detected. When the absolute value of the change ratio in the pressure is less than a predetermined value, the control device 3 can detect that there is an abnormality in the valve device. In other words, incorrect detection can be reduced as to the abnormality in the valve device.

The leak preventive structure of the leak port 4 is positioned near the main part 150 than the seal component 1550 which tightly seals the clearance between the outflow port 155 and the intake pipe 22. When the purge valve 15 is detached from the intake pipe 22, the seal component 40 fails to work prior to the seal component 1550. Therefore, when the valve device is detached, the leak port 4 can be certainly detached to quickly detect the leak.

Second Embodiment

An abnormality detection control according to a second embodiment is explained with reference to FIG. 4 and FIG. 6.

Figure 4:
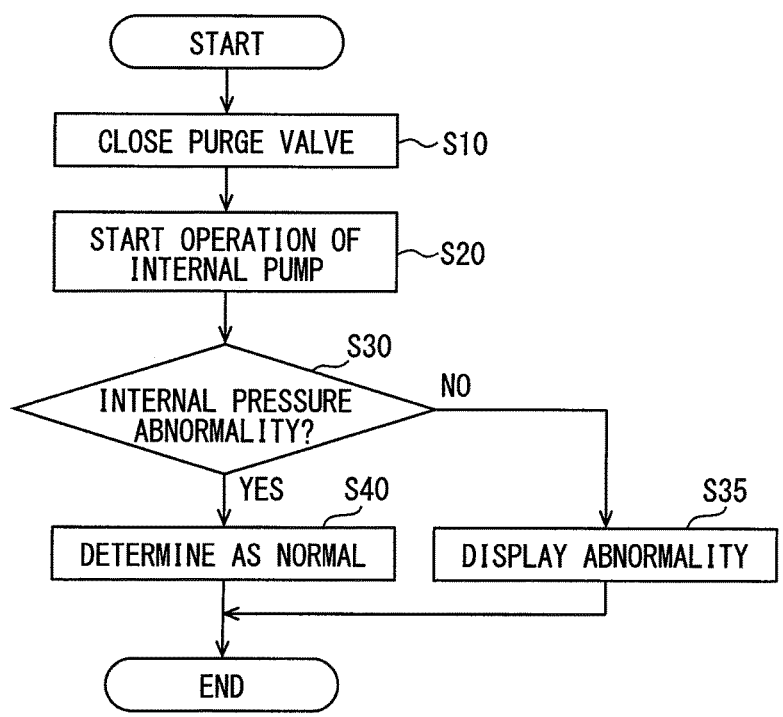
FIG. 4 is a flow chart of a control detecting abnormality such as leak in the fuel vapor purge system of the first embodiment.

In the second embodiment, the internal pump 121 is operated to draw atmospheric air from the outside into the purge passage, in S20 of FIG. 4. Since the atmosphere air is drawn by the internal pump 121 into the passage from the inside of the fuel tank 10 to the purge valve 15, the internal pressure inside the fuel tank 10 will be in the positive pressure state where the pressure is higher than atmospheric pressure.

The control device 3 continues this state for a predetermined period of time, such that it can be determined whether there is abnormality such as detachment of the purge valve 15. At S30, the determination circuit 30 determines whether a normal condition of the valve device is satisfied to determine that there are no abnormalities in the valve device.

Figure 6:
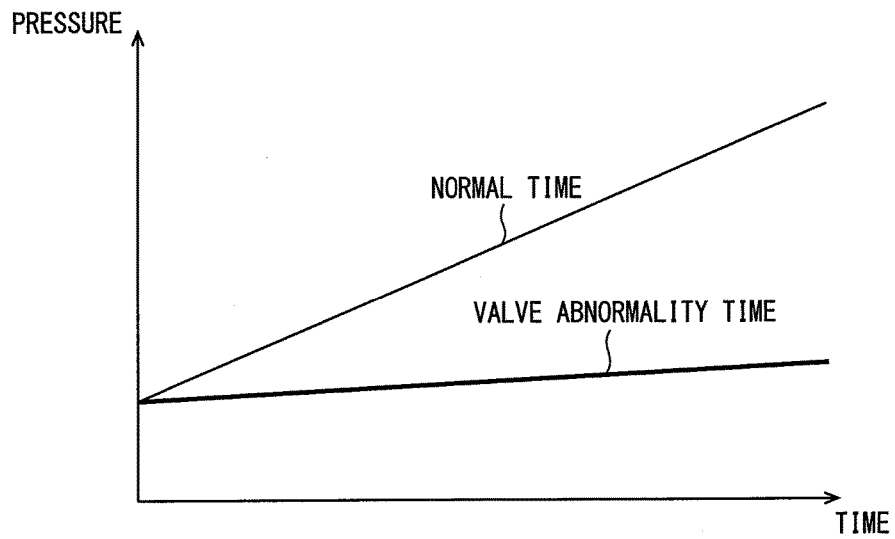
FIG. 6 is a graph illustrating a pressure change at a normal time and a pressure change at an abnormality time in a purge valve according to a second embodiment when an internal pump pumps draws atmospheric air.

In this state, when the sealing by the seal component 40 is normal, the pressure value detected by the pressure sensor 11 continuously increases from atmospheric pressure by operation of the internal pump 121, as shown in a pressure change of the normal time in FIG. 6, because the atmosphere air loses a place to go in the closed passage due to the seal component 40 and the valve object 152. Conversely, at an abnormality time when the sealing by the seal component 40 does not function, since the atmosphere air is discharged outside through the leak passage 41, as shown in the abnormality time of FIG. 6, the pressure value does not increase as compared with the normal time.

The normal condition is satisfied, for example, when the absolute value of the pressure change per unit time (pressure change ratio) is larger than or equal to a predetermined value. Therefore, the determination circuit 30 determines that there is an abnormality when the absolute value of the pressure change ratio is less than the predetermined value. The determination circuit 30 determines that there is no abnormality when the absolute value of the pressure change ratio is more than or equal to the predetermined value.

At a normal time when the valve device is properly equipped, atmospheric air is continuously introduced by the internal pump 121 into the closed passage, the degree of positive pressure relative to atmospheric pressure becomes large in the detected pressure, for gas such as vapor fuel in the passage. At an abnormality time, for example, in the valve device, since the leak passage 41 communicates with outside air, the atmospheric air introduced into the passage is continuously discharged to outside through the leak passage 41. Therefore, the degree of positive pressure relative to atmospheric pressure becomes small in the detected pressure. Thereby, the control device 3 can properly detect the abnormality in the valve device, when the absolute value of the change ratio in the detected pressure is less than a predetermined value. Therefore, incorrect detection can be reduced as to the abnormality in the valve device, when detecting abnormality in the valve device using the internal pump 121 which introduces outside air.

Third Embodiment

An abnormality detection control according to a third embodiment is explained with reference to FIG. 7 and FIG. 8 in comparison of the first embodiment.

S100, S135, and S140 in the abnormality detection control of the third embodiment are equivalent to S10, S35, and S40 of the first embodiment, respectively.

When this flow chart is started, the control device 3 closes the purge valve 15 at S100 by supplying no current to the electric circuit, such that the purge valve 15 is in the closed state. The control device 3 controls to close CCV 120 at S105, and operates the purge pump 14 to rotate forward at S120. Thereby, when the purge valve 15 is properly equipped, the passage from the inside of the fuel tank 10 to the purge valve 15 turns into a closed passage. Since gas pumped by the purge pump 14 toward the purge valve 15 loses a place to go, the internal pressure inside the fuel tank 10 will be slightly lower than atmospheric pressure.

The control device 3 acquires the signal of internal pressure in the fuel tank 10 detected by the pressure sensor 11 at S130, and the determination circuit 30 determines whether the normal condition of the valve device is satisfied. In this state, when the sealing by the seal component 40 is normal, the pressure value detected by the pressure sensor 11 falls slightly from atmospheric pressure by operation of the internal pump 121, as shown in the pressure change of the normal time in FIG. 8. Conversely, at an abnormality time when the sealing by the seal component 40 is not functioned, gas is discharged outside from the leak port 4. Therefore, the detected pressure falls greatly as shown in the abnormality time of FIG. 8, compared with the normal time.

The normal condition is satisfied, for example, when the absolute value of the pressure change per unit time (rate of pressure change) is lower than the predetermined value or when the absolute value of the pressure change per unit time (rate of pressure change) is lower than or equal to the predetermined value. When the absolute value of pressure change ratio exceeds a predetermined value, the determination circuit 30 determines that there is abnormality. When the absolute value of pressure change ratio is below the predetermined value, the determination circuit 30 determines that there is no abnormality.

When the determination circuit 30 determines that the normal condition is not satisfied at S130, the control device 30 alarms the abnormality in the valve device at S135, and the abnormality detection control is ended. When a predetermined time passes after the end of the abnormality detection control, S100 will be started again. When the determination circuit 30 determines that the normal condition is satisfied at S130, since the determination result is normal, a normal determination processing is performed at S140, and this abnormality detection control is finished.

The control device 3 rotates the purge pump 14 forward in the state where CCV 120 is closed and where the valve object 152 is controlled in the prohibition state (S100, S105, S120), and detects the pressure at the predetermined position in the passage from the inside and the refueling port of the fuel tank 10 to the valve device. When the absolute value of the change ratio in the pressure detected in this way is larger than or equal to a predetermined value, the control device 3 determines that there is an abnormality (S130, S135).

According to the third embodiment, at a normal time when the valve device is properly equipped, since the vapor fuel in the passage has nowhere to go, when the purge pump 14 pumps the gas into the intake passage, the degree of negative pressure relative to atmospheric pressure is small in the pressure detected. At an abnormality time in the valve device, the gas pumped by the purge pump 14 is continuously discharged outside through the leak passage 41, since the leak passage 41 communicates to the outside. Therefore, the degree of negative pressure relative to atmospheric pressure becomes large in the detected pressure. Thus, when the absolute value of the pressure change ratio is larger than or equal to a predetermined value, the control device 3 can properly detect that the valve device is in the abnormal condition. Thus, incorrect detection can be reduced as to the abnormality in the valve device when using the purge pump 14 to rotate forward.

Fourth Embodiment

Figure 9:
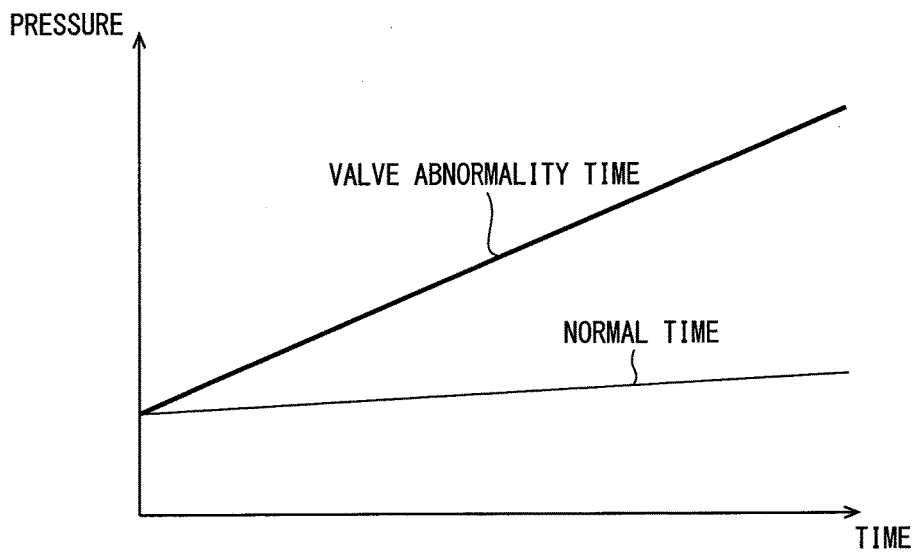
FIG. 9 is a graph illustrating a pressure change at a normal time and a pressure change at an abnormality time in a purge valve according to a fourth embodiment when a purge pump is rotated reversely.

An abnormality detection control according to a fourth embodiment is explained with reference to FIG. 7 and FIG. 9 at points different from the third embodiment and the first embodiment.

Figure 7:
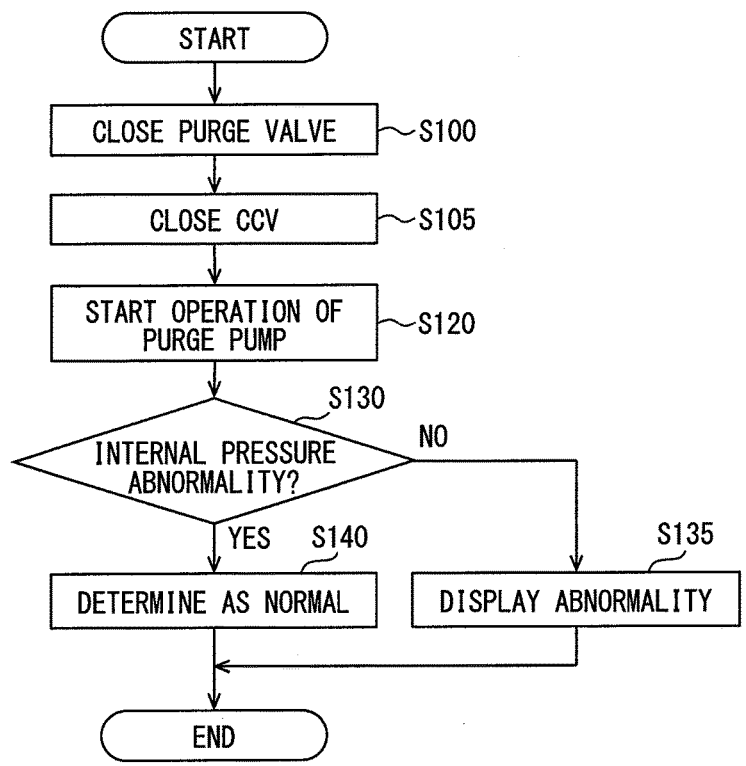
FIG. 7 is a flow chart of a control detecting abnormality such as leak in a fuel vapor purge system according to a third embodiment.
Figure 8:
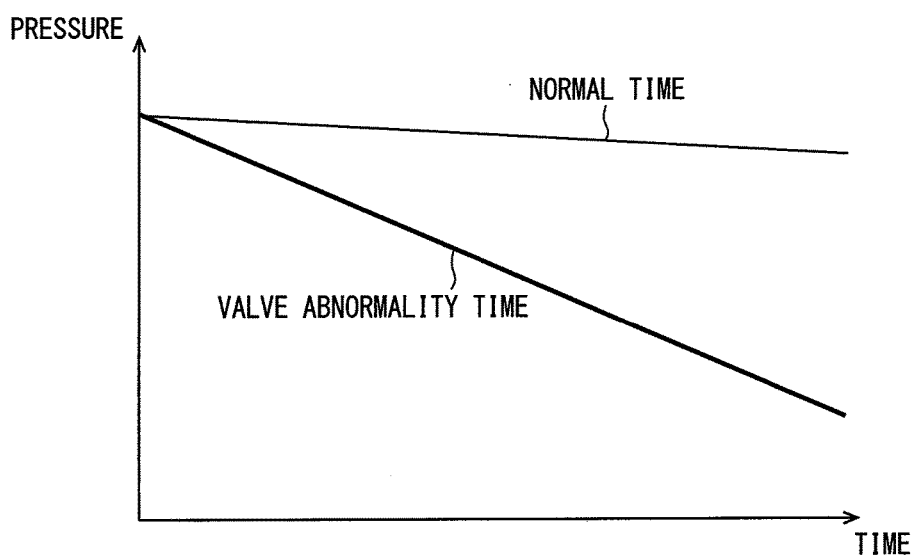
FIG. 8 is a graph illustrating a pressure change at a normal time and a pressure change at an abnormality time in a purge valve of the third embodiment when a purge pump is rotated forward.

In the fourth embodiment, the purge pump 14 is operated to rotate in the opposite direction in S120 of FIG. 7. In this state, when the purge valve 15 is properly equipped, the passage from the inside of the fuel tank 10 to the purge valve 15 is a closed passage. The gas sent toward the fuel tank 10 by the purge pump 14 is pressurized, and the internal pressure inside the fuel tank 10 becomes slightly higher than atmospheric pressure.

At S130, the control device 3 continues this state for a predetermined period of time, such that it can be determined whether there is no abnormality such as detachment of the purge valve 15. If the sealing by the seal component 40 is normal in S130, the pressure value detected by the pressure sensor 11, as illustrated in the normal time in FIG. 9, is in a low pressure state where the pressure is slightly higher than atmospheric pressure.

Conversely, at an abnormality time when the sealing by the seal component 40 is not functioned, outside air is continuously sent from the outflow port 155 through the purge valve 15 into the fuel tank 10. For this reason, as shown in the abnormality time in FIG. 9, the pressure value increases greatly as compared with the normal time. The normal condition is satisfied, for example, when the absolute value of the pressure change per unit time (rate of pressure change) is below a predetermined value. Therefore, the determination circuit 30 determines that there is an abnormality, when the absolute value of a change ratio in the pressure exceeds the predetermined value. When the absolute value of a change ratio in the pressure is below the predetermined value, the determination circuit 30 determines that there is no abnormality.

After the control device 3 closes CCV 120 and controls the valve object 152 in the prohibition state, the purge pump 14 is operated to rotate reversely (S100, S105, S120). The pressure is detected at the predetermined position in the passage from the inside and the refueling port of the fuel tank 10 to the valve device. The control device 3 determines that there is abnormality, when the absolute value of the change ratio in the pressure detected in this state is beyond the predetermined value (S130, S135).

According to the present embodiment, at a normal time when the valve device is properly equipped, since the purge pump 14 pumps gas toward the fuel tank 10, the degree of positive pressure relative to atmospheric pressure becomes small in the pressure detected. At an abnormality time in the valve device, the leak passage 41 communicates to the outside. Since the gas sent toward the fuel tank 10 is continuously introduced through the leak passage 41 by the purge pump 14, the degree of positive pressure relative to atmospheric pressure becomes large in the detected pressure. Thus, the control device 3 can detect properly that the valve device is in the abnormal condition, when the absolute value of the change ratio in the detected pressure is beyond the predetermined value. Accordingly, incorrect detection can be reduced as to the abnormality in the valve device using the purge pump 14 rotated in the reverse direction.

Fifth Embodiment

A valve device of a fuel vapor purge system according to a fifth embodiment is explained with reference to FIG. 10 at points different from the first embodiment.

Figure 10:
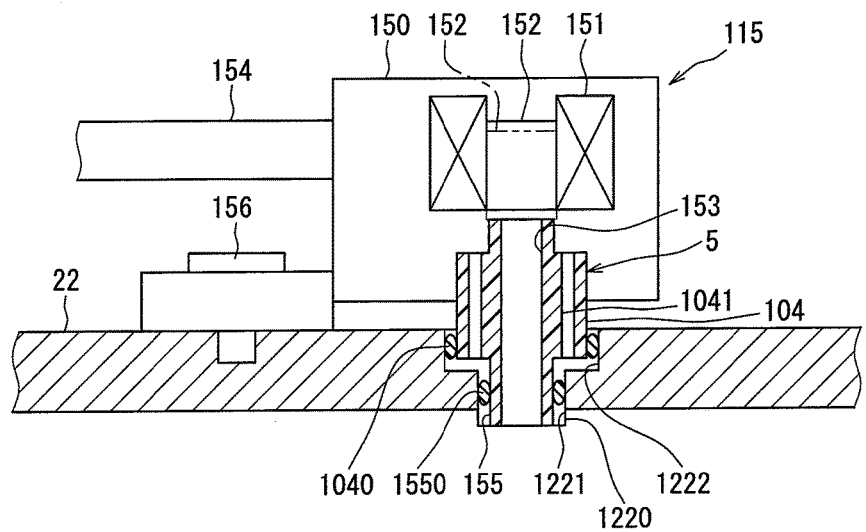
FIG. 10 is an enlarged view illustrating a connection structure between a purge valve and an intake pipe of a fuel vapor purge system according to a fifth embodiment.

As shown in FIG. 10, the purge valve 115 which is a valve device of the fifth embodiment has a connection component 5 integrally having a leak port 104 and an outflow port 155. The connection component 5 connects the main part 150 to the intake pipe 22, and connects the internal passage in the main part 150 to the intake passage. The leak port 104 functions similarly to the leak port 4 of the first embodiment. In FIG. 10, the valve object 152 illustrated in a solid line represents the permission state in which vapor fuel is allowed to flow into the intake passage, and the valve object 152 illustrated in a double chain line represents the prohibition state in which vapor fuel is prohibited from flowing into the intake passage.

The connection component 5 integrally has the leak port 104 and the outflow port 155 to have the same axis. The outflow port 155 has a cylindrical passage connected to the fuel supply passage 153. The leak port 104 has a cylindrical leak passage 1041. The cylindrical leak passage 1041 is formed to have the same axis as the cylindrical passage of the outflow port 155, and is a circular passage in the cross section surrounding the outer side of the cylindrical passage. Therefore, the leak port 104 has a larger outer diameter larger than that of the outflow port 155.

The connection component 5 passes through the intake pipe 22 by being inserted into an engine port 1220 connecting the intake passage of the intake pipe 22 to the exterior. The connection component 5 has a small diameter part located on the downstream side adjacent to the intake passage, and a large diameter part located on the upstream side adjacent to the valve object 152. The small diameter part has an outer diameter equivalent to the outflow port 155. The large diameter part has a larger outer diameter larger than the outflow port 155.

The engine port 1220 has an inner hole part 1221 into which the small diameter part is inserted, and an outer hole part 1222 into which the large diameter part is inserted. The outer hole part 1222 is located adjacently on the outer side of the inner hole part 1221. The engine port 1220 has a penetration hole part passing through the pipe section of the intake pipe 22, in which a concave portion equivalent to the outer hole part 1222 is formed from the outer side to the inner side and the inner hole part 1221 passing through the center of the concave portion is formed in this order.

As shown in FIG. 10, when the valve device is properly fitted with the intake pipe 22, all or a part of a projected portion of the connection component 5 projected from the main part 150 is fitted in the penetration hole part of the intake pipe 22 corresponding to the engine port 1220. That is, the connection component 5 is connected to the intake pipe 22 by inserting all or a part of the large diameter part and the small diameter part into the penetration hole part of the engine port 1220.

A clearance between the outer circumference of the outflow port 155 and the inner circumference of the inner hole part 1221 is tightly sealed by the seal component 1550 such as O ring fitted to the outer circumference of the outflow port 155. A clearance between the outer circumference of the leak port 104 and the inner circumference of the outer hole part 1222 is sealed by the seal components 1040 such as O ring fitted to the outer circumference of the leak port 104. Therefore, when the valve device is properly fitted with the intake pipe 22, the passage extending from the inflow port 154 to the leak passage 1041 through the internal passage becomes a closed passage due to the seal component 1550 and the seal component 1040. Thus, when the purge valve 115 is fitted into the intake pipe 22, the leak port 104 has the leak preventive structure which prevents vapor fuel from leaking to the outside.

The outflow port 155 and the leak port 104 are formed to have the same axis. Accordingly, since the outflow port 155 and the leak port 104 are defined inside of the same solid object, if the valve device is detached from the passage component such that the outflow port 155 is exposed to outside, the leak port 104 can also be exposed to outside. Therefore, the abnormality in the valve device, in other words, the outflow port 155 which is exposed to outside can be certainly detected.

Furthermore, the leak port 104 is located on the radially outer side of the outflow port 155 while having the same axis. Accordingly, since the cross-section area of the leak passage 1041 can be easily increased, the pressure change used for detecting the leak can be generated in the leak port 104. Therefore, the abnormality can be clearly detected due to the leak port 104.

The leak preventive structure of the leak port 104 is positioned near the main part 150 than the seal component 1550 which tightly seals the clearance between the outflow port 155 and the intake pipe 22. When the purge valve 115 is detached from the intake pipe 22, the seal component 1040 fails to work prior to the seal component 1550. Therefore, when the valve device is detached, the leak port 104 can be certainly detached to quickly detect the leak.

Sixth Embodiment

Figure 11:
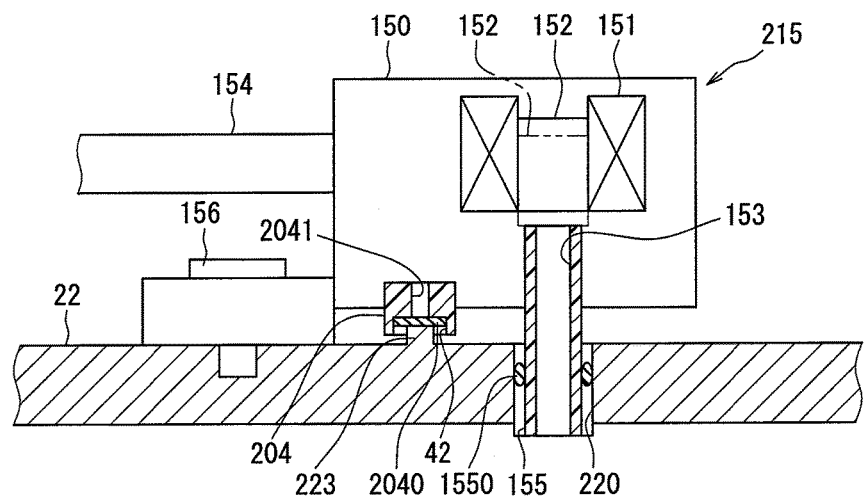
FIG. 11 is an enlarged view illustrating a connection structure between a purge valve and an intake pipe of a fuel vapor purge system according to a sixth embodiment.

A valve device of a fuel vapor purge system according to a sixth embodiment is explained with reference to FIG. 11 at points different from the first embodiment. In FIG. 11, the valve object 152 illustrated in a solid line represents the permission state, and the valve object 152 illustrated in a double chain line represents the prohibition state.

As shown in FIG. 11, the purge valve 215 which is a valve device of the sixth embodiment has the leak port 204. The leak port 204 of the purge valve 215 functions similarly as the leak port 4 of the first embodiment. The internal leak passage 2041 of the leak port 204 is connected with the internal passage of the main part 150. The leak port 204 is a cylindrical part projected from the main part 150.

The leak port 204 has the leak passage 2041 connected to the internal passage inside of the cylindrical part, and a concave portion 42 through which the leak passage 2041 is communicated to the exterior. The concave portion 42 is defined on a reverse end surface opposite from the leak passage 2041, and has a larger inside diameter larger than the leak passage 2041. The concave portion 42 is connected with the leak passage 2041 by a hole part passing through at the center. The intake pipe 22 has a projection part 223 projected toward the bottom surface of the concave portion 42. The projection part 223 has an outer dimension which is able to push the bottom surface of the concave portion 42. Therefore, the outer dimension of the projection part 223 is smaller than the inner diameter of the concave portion 42. The concave portion 42 receives the seal component 2040 which is elastically deformable by being pushed by the projection part 223.

As shown in FIG. 11, when the intake pipe 22 is properly equipped with the valve device, a part or all of the projection part 223 is received in the concave portion 42 of the leak port 204. The bottom surface of the concave portion 42 and the tip end surface of the projection part 223 are in tight contact through the seal component 2040. Therefore, the clearance between the leak passage 2041 and the exterior of the purge valve 215 is tightly sealed by the seal component 2040. Thereby, the passage extending from the inflow port 154 to the leak passage 2041 becomes a closed passage due to the seal component 2040 and the projection part 223. Thus, the leak port 204 has the leak preventive structure which prevents vapor fuel from leaking to the exterior when the intake pipe 22 is equipped with the purge valve 215. The sealing structure is secured by providing the seal component 2040 between the bottom surface of the concave portion 42 and the tip end surface of the projection part 223. Therefore, even if the projection amount of the projection part 223 is small, the sealing property can be obtained. Since permissible dimensional tolerance can be sufficiently set for a distance between the bottom surface of the concave portion 42 and the tip end surface of the projection part 223, the productive leak preventive structure can be offered.

The leak preventive structure of the leak port 204 is positioned near the main part 150 than the seal component 1550 which tightly seals the clearance between the outflow port 155 and the intake pipe 22. When the purge valve 215 is detached from the intake pipe 22, the seal component 2040 fails to work prior to the seal component 1550. Therefore, when the valve device is detached, the leak port 204 can be certainly detached to quickly detect the leak.

Seventh Embodiment

Figure 12:
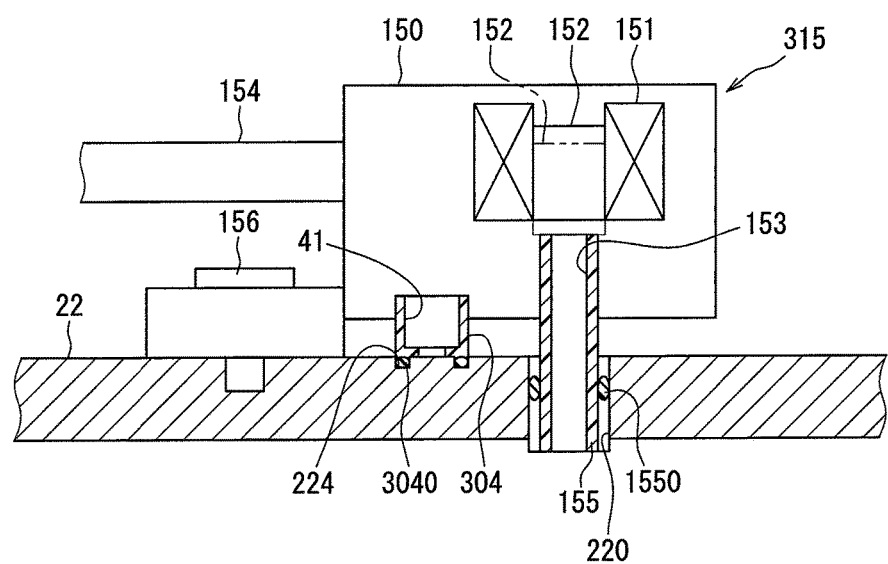
FIG. 12 is an enlarged view illustrating a connection structure between a purge valve and an intake pipe of a fuel vapor purge system according to a seventh embodiment.

A valve device of a fuel vapor purge system according to a seventh embodiment is explained with reference to FIG. 12 at points different from the first embodiment. In FIG. 12, the valve object 152 illustrated in a solid line represents the permission state, and the valve object 152 illustrated in a double chain line represents the prohibition state.

As shown in FIG. 12, the purge valve 315 which is a valve device of the seventh embodiment has the leak port 304 which functions similarly to the leak port 4 of the first embodiment. The leak passage 41 inside of the leak port 304 is connected with the internal passage in the main part 150. The leak port 304 is a cylindrical part projected from the main part 150.

The intake pipe 22 has an annular groove portion 224 which receives the seal component 3040 such as O ring. As shown in FIG. 12, in the state where the intake pipe 22 is properly equipped with the valve device, the end surface of the leak port 304 adjacent to the intake passage and the groove portion 224 of the intake pipe 22 are in tight contact with each other through the seal component 3040. Therefore, the clearance between the leak passage 41 and the exterior of the purge valve 315 is tightly sealed by the seal component 3040. Thereby, the passage extending from the inflow port 154 to the leak passage 41 becomes a closed passage due to the seal component 3040 received in the groove portion 224. Thus, the leak port 304 has the leak preventive structure which prevents vapor fuel from leaking to the exterior when the intake pipe 22 is equipped with the purge valve 315. Since the seal component 3040 is disposed in the intake pipe 22, the structure can be simplified, compared with a case where the seal component 3040 is disposed in the leak port.

The leak preventive structure of the leak port 304 is positioned near the main part 150 than the seal component 1550 which tightly seals the clearance between the outflow port 155 and the intake pipe 22. When the purge valve 315 is detached from the intake pipe 22, the seal component 3040 fails to work prior to the seal component 1550. Therefore, when the valve device is detached, the leak port 304 can be certainly detached to quickly detect the leak.

Other Embodiment

The present disclosure may be implemented not restricted to the embodiments, and may be implemented through modifications by a person skilled in the art. For example, the disclosure is not limited to the components or the combinations of elements described in the embodiments, and can be modified variously to be implemented. The present disclosure may include an additional portion which can be added to the embodiments. The present disclosure may be implemented by omitting the elements in the embodiments. The present disclosure includes modifications such as replacement or combination in the components between one embodiment and the other embodiment. The technical scope of the present disclosure is not limited to the embodiments. The technical scope of the present disclosure should be shown by the appended claims, and also should be understood to include all the changes in the equivalence.

Although the outflow port and the leak port are connected to the intake pipe 22 in the embodiments, the outflow port and the leak port are not limited to be connected to the intake pipe 22 while the fuel supply passage 153 is connected to the intake passage of the engine. For example, the outflow port or the leak port may be connected to the intake manifold 20.

In the embodiment, the leak passage 1041 is a cylindrical passage defined inside of the leak port 104. However, if the leak passage 1041 is defined on the outer side of the outflow port 155, the leak passage 1041 may have a slit shape, a circular shape, a rectangle shape, an ellipse shape and the like in the cross section, and the number of the leak passages 1041 may be plural.

In the embodiments, the pressure sensor 11 is an example of equipment which detects the pressure at a predetermined position in the passage from the inside and the refueling port of the fuel tank 10 to the purge valve 15. The pressure may be detected by a sensor at a predetermined position in the purge passage 17 or the vapor passage 16.

The purge valve 15 is adopted in the embodiments as a valve device which is fitted into the intake pipe 22. The valve device should just be an equipment with a valve switched between the full open state and the full closed state in the passage connected to the intake passage of the internal-combustion engine 2. For example, the valve device may be an opening-and-closing valve which can be switched between the full open state and the full closed state. The purge valve 15 which can adjust the valve opening degree in the passage may be placed adjacent to the canister 13 than this valve device. Moreover, the valve device connected to the intake passage may be configured to have the purge pump 14 and the purge valve 15 inside.

In the fuel vapor purge system 1, if the fuel tank is configured to be tightly sealed, the same abnormality determination as the embodiment can be performed using the pressure measured at the purge passage to the valve device except the fuel tank.

In the embodiments, the fuel vapor purge system 1 may not include the supercharger and/or the throttle valve.

Such changes and modifications are to be understood as being within the scope of the present disclosure as defined by the appended claims.

What is claimed is:

1. A fuel vapor purge system comprising:
   a fuel tank storing fuel;
   a canister adsorbing vapor fuel emitted from the fuel tank, the canister being able to desorb the vapor fuel;
   a passage component that defines an intake passage of an internal-combustion engine in which the vapor fuel desorbed from the canister is mixed and combusted with fuel downstream from the intake passage;
   a purge pump pumping the vapor fuel from the canister toward the intake passage through a purge passage;
   a valve device having a main part in which an internal passage is defined and a valve object switching between a permission state in which the vapor fuel is allowed to flow into the intake passage and a prohibition state in which the vapor fuel is prevented from flowing into the intake passage, the valve device being disposed to the passage component to control a flow of the vapor fuel pumped by the purge pump; and
   a controller configured to control the valve object between the permission state and the prohibition state, wherein
   the valve device has
      an inflow port through which the vapor fuel pumped from the canister flows into the main part,
      an outflow port connected with the inflow port through the internal passage and being opened to the intake passage, and
      a leak port connected with the inflow port through the internal passage and being opened to outside of the main part,
   the leak port has a leak preventive structure which prevents the vapor fuel from leaking to outside when the valve device is attached to the passage component such that the vapor fuel is able to flow into the intake passage,
   the leak preventive structure of the leak port comprises a first seal component positioned closer to the main part than a second seal component which seals a clearance between the outflow port and the passage component, and
   the first seal component of the leak preventive structure of the leak port is configured to fail to work prior to the second seal component which seals the clearance between the outflow port and the passage component when the valve device is detached from the passage component.

2. The fuel vapor purge system according to claim 1 further comprising:
   an internal pump arranged integrally with the canister to emit gas to atmosphere or draw atmospheric air, wherein
   the controller determines that there is an abnormality when the internal pump is operated in a state where the valve object is controlled in the prohibition state and when an absolute value of a pressure change ratio detected at a predetermined position in a passage from the fuel tank to the valve device is less than a predetermined value.

3. The fuel vapor purge system according to claim 1, wherein
   the controller determines that there is an abnormality when the purge pump is operated in a state where the valve object is controlled in the prohibition state and when an absolute value of a pressure change ratio detected at a predetermined position in a passage from the fuel tank to the valve device is larger than or equal to a predetermined value.

4. The fuel vapor purge system according to claim 1, wherein
   the controller outputs an alarm when the controller determines that there is an abnormality.

5. The fuel vapor purge system according to claim 1, wherein
   the outflow port and the leak port are arranged to have a same axis.

6. The fuel vapor purge system according to claim 1, wherein when the valve device is detached from the passage component, after the first seal component of the leak preventive structure of the leak port fails to work, the second seal component which seals the clearance between the outflow port and the passage component is configured to prevent the vapor fuel from leaking to outside.

7. The fuel vapor purge system according to claim 1, wherein
   the outflow port has an axis different from an axis of the leak port.

8. The fuel vapor purge system according to claim 1, wherein
   the first seal component is provided relative to a leak port access; and
   the second seal component is provided relative to an outflow port access.

9. The fuel vapor purge system according to claim 1, wherein
   the first seal component is positioned directly adjacent to the main part of the valve device.

10. The fuel vapor purge system according to claim 1, wherein
    a length of the leak port is less than a length of the outflow port.

* * * * *